United States Patent [19]

Stone

[11] Patent Number: 5,775,460

[45] Date of Patent: Jul. 7, 1998

[54] HINGE AND LADDER

[76] Inventor: Mark James Stone, 67 Marshall Lane, Kenmore, Queensland, 4069, Australia

[21] Appl. No.: 590,467

[22] Filed: Jan. 23, 1996

[30] Foreign Application Priority Data

Feb. 2, 1995 [AU] Australia ............................... PN0880
Aug. 17, 1995 [AU] Australia ............................... PN4804

[51] Int. Cl.⁶ ................................................ F16D 1/00
[52] U.S. Cl. ........................... 182/22; 182/24; 16/354; 403/93; 403/100
[58] Field of Search ............................ 182/22, 23, 24, 182/163; 16/352, 353, 354; 403/84, 87, 91, 93, 96, 100, 103

[56] References Cited

U.S. PATENT DOCUMENTS

| | | |
|---|---|---|
| 4,614,454 | 9/1986 | Kassai . |
| 4,666,327 | 5/1987 | Su ........................................ 182/24 X |
| 5,241,716 | 9/1993 | Kohus .................................. 16/354 X |
| 5,353,892 | 10/1994 | Lu ...................................... 182/22 X |

FOREIGN PATENT DOCUMENTS

| | | |
|---|---|---|
| 59883/69 | 2/1971 | Australia . |
| 46097/72 | 3/1974 | Australia . |
| B-36676/78 | 12/1979 | Australia . |
| B-16554/83 | 9/1983 | Australia . |
| A-51129/85 | 8/1986 | Australia . |
| B-60180/86 | 1/1988 | Australia . |
| B-12823/92 | 9/1993 | Australia . |

*Primary Examiner*—Alvin C. Chin-Shue
*Assistant Examiner*—Long Dinh Phan
*Attorney, Agent, or Firm*—Fishman, Dionne, Cantor & Colburn

[57] ABSTRACT

A hinge and a reconfigurable ladder having at least one pair of hinges is disclosed. The ladder has stile sections connected together by the hinges. The hinges consist of two hinge members mountable to ends of respective stile sections. A hinge cover extends over and receives the hinge members which are pivotally connected to the cover. The hinge members are linked to each other to control the pivotal movement of the hinge member so that they both pivot in unison and to the same extend relative to the cover. The hinge members have locating apertures. A locking mechanism is cooperable with the locating apertures for locking the hinge members in a desired relative position to one another.

16 Claims, 18 Drawing Sheets

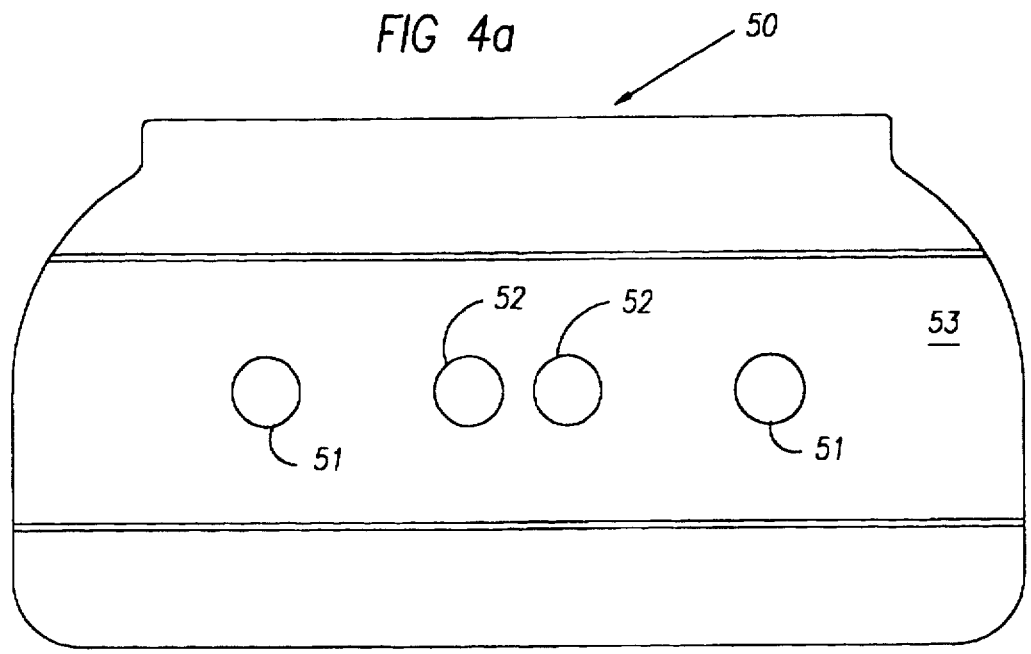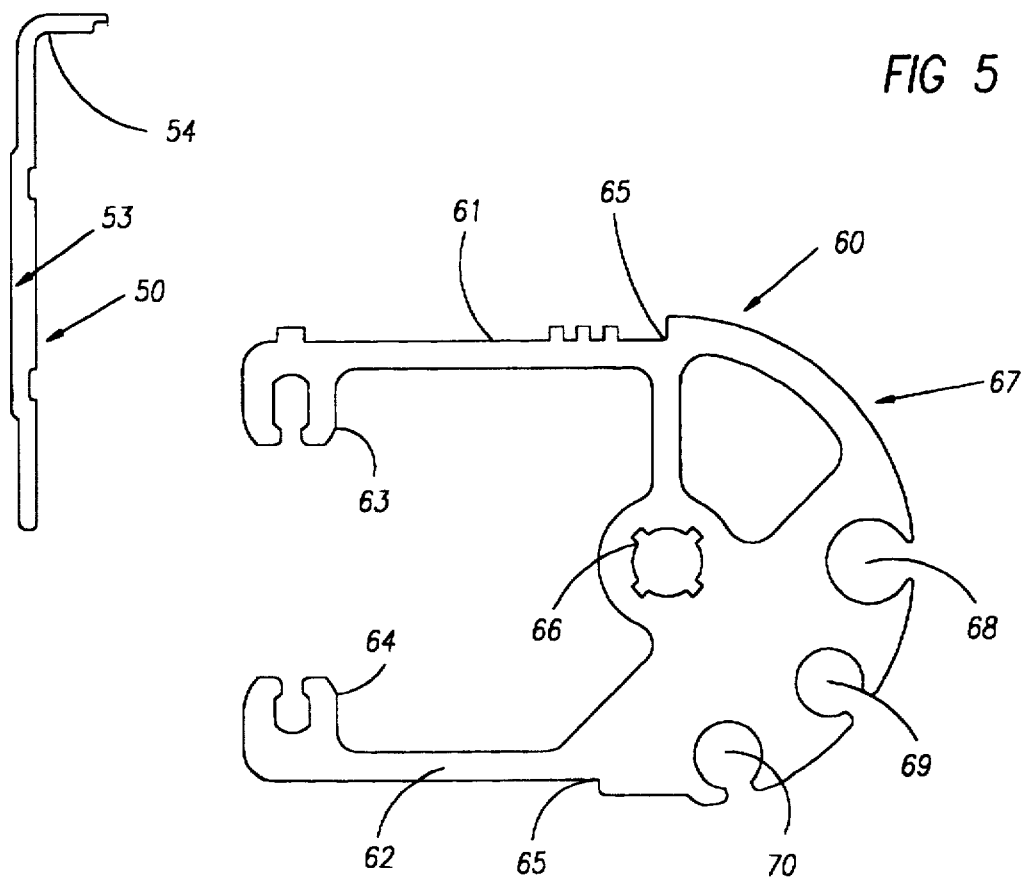

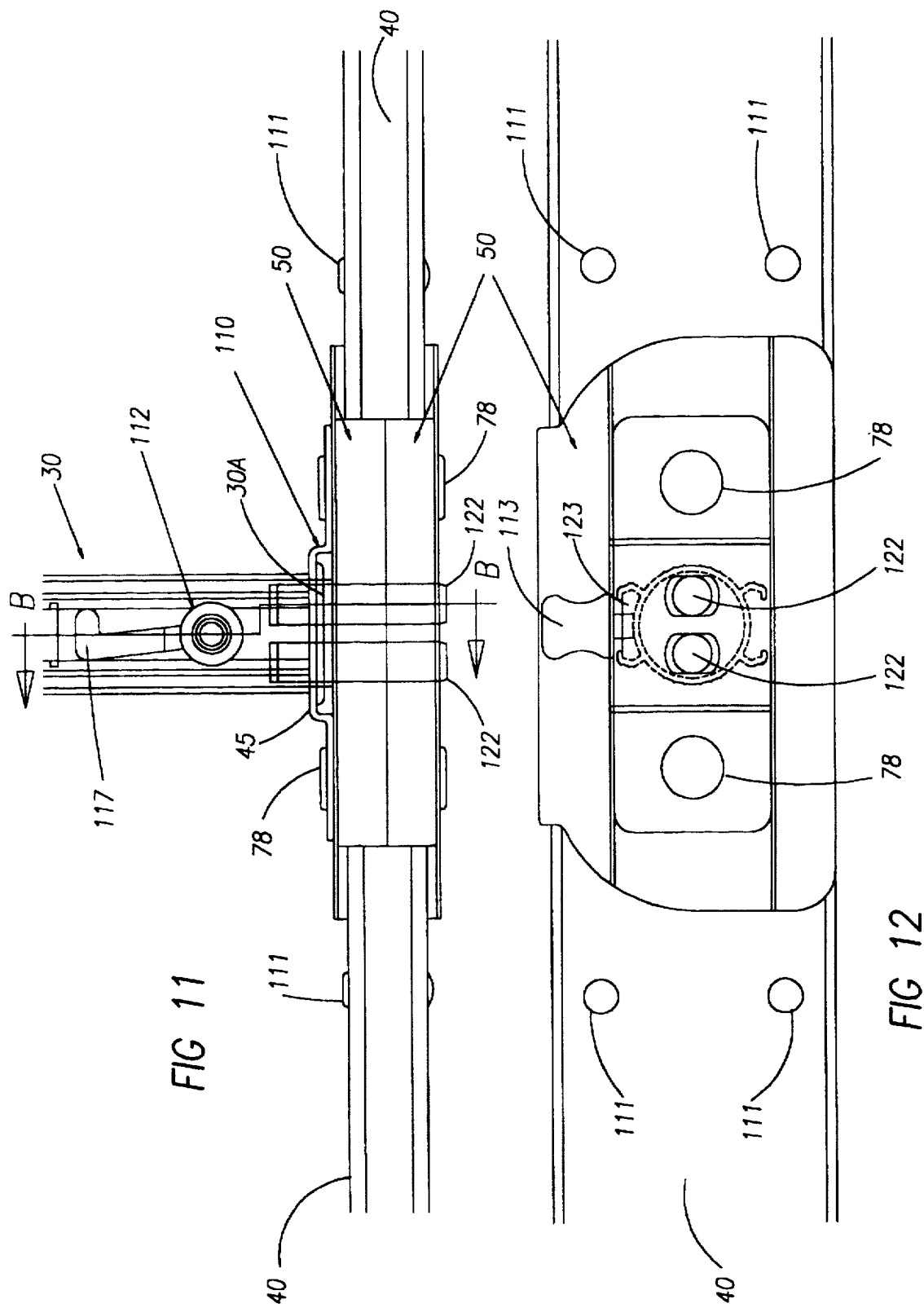

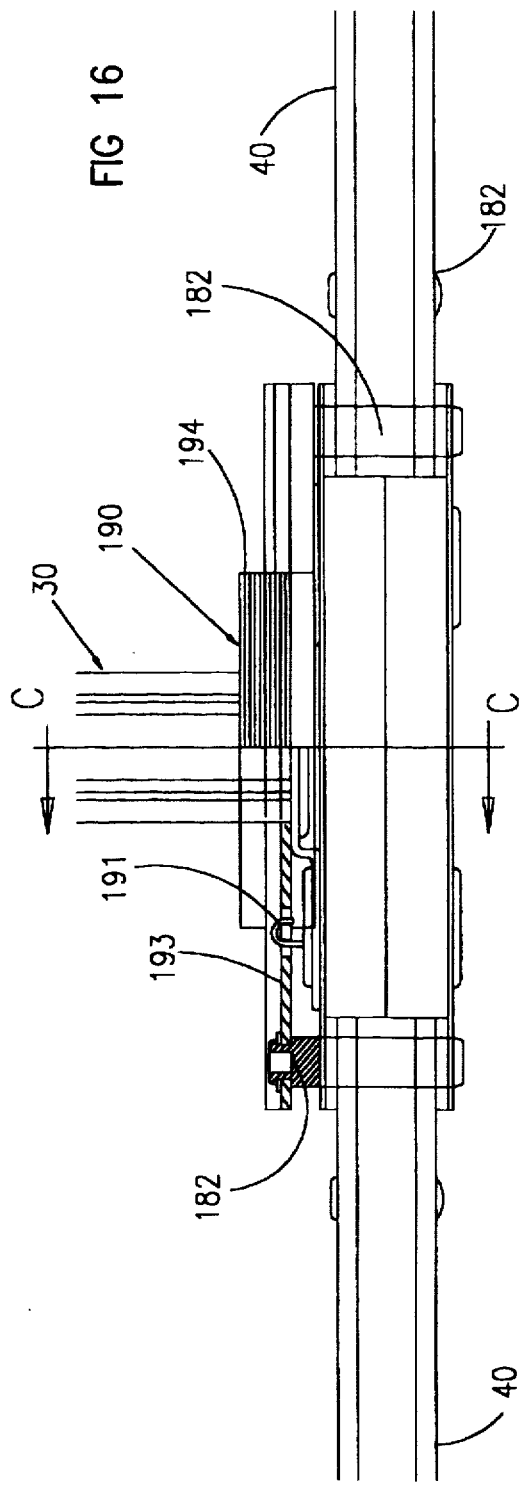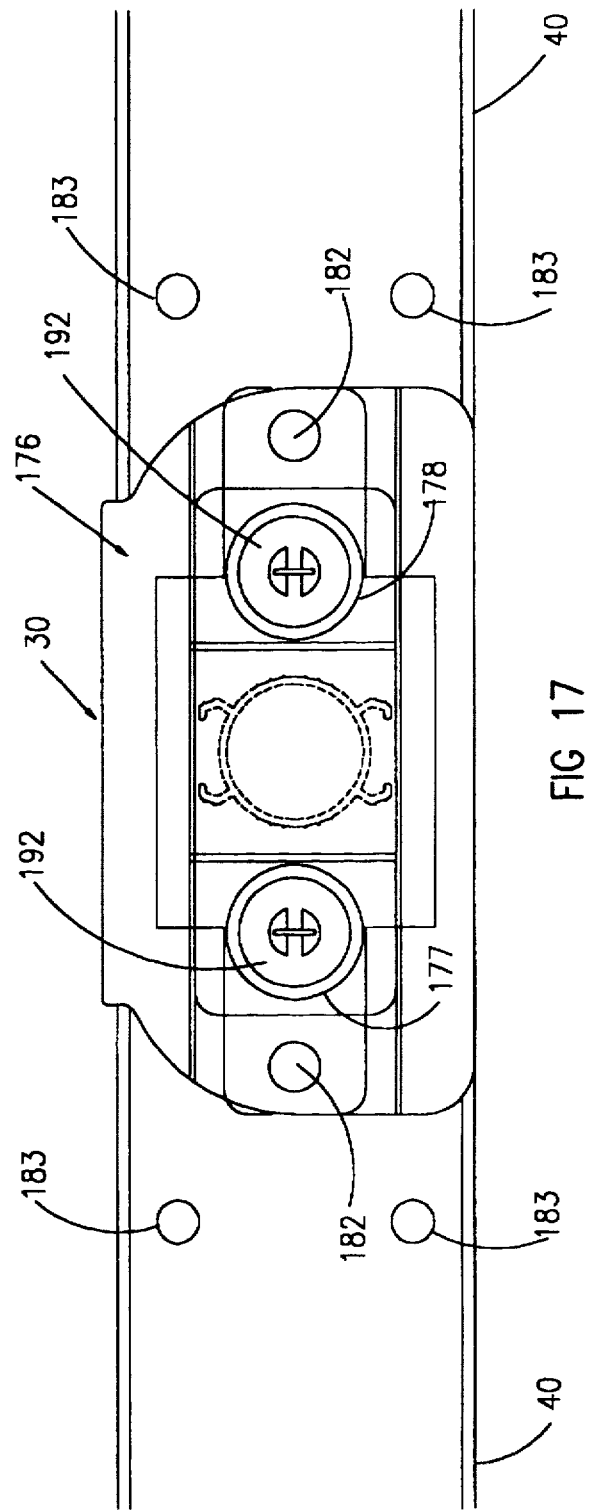

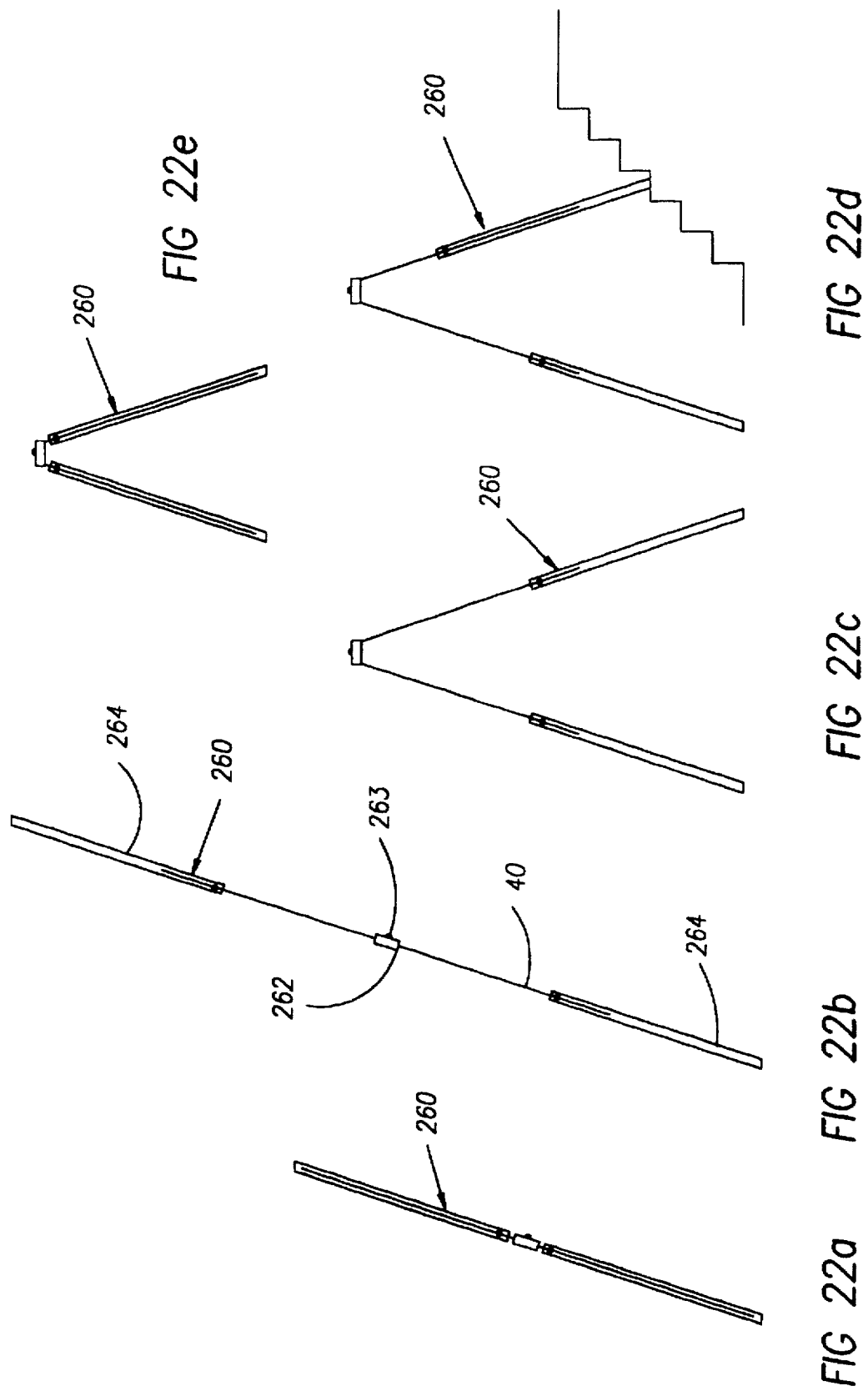

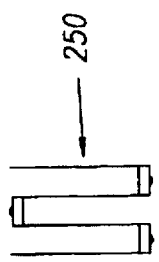
FIG 23e
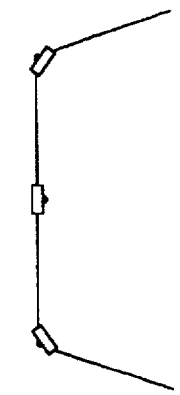
FIG 23d
FIG 23c
FIG 23b
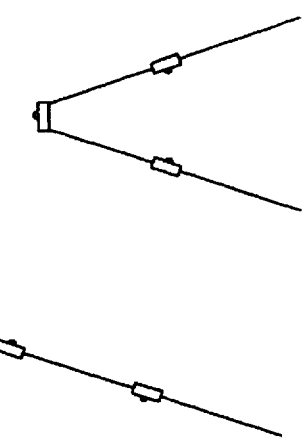
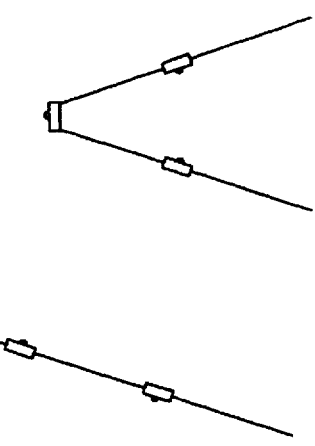
FIG 23a
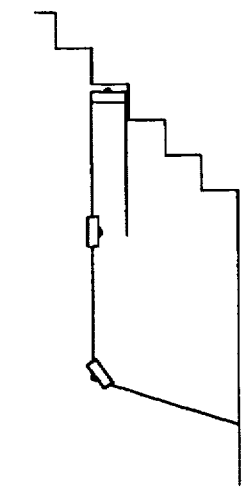
FIG 23i
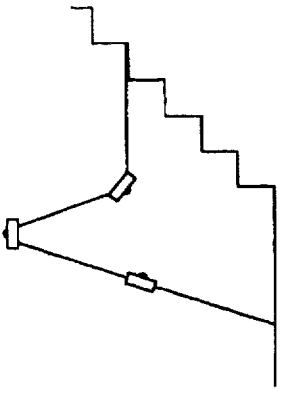
FIG 23h
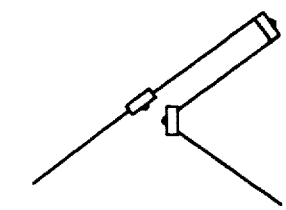
FIG 23g
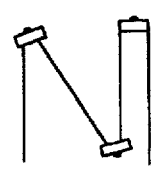
FIG 23f

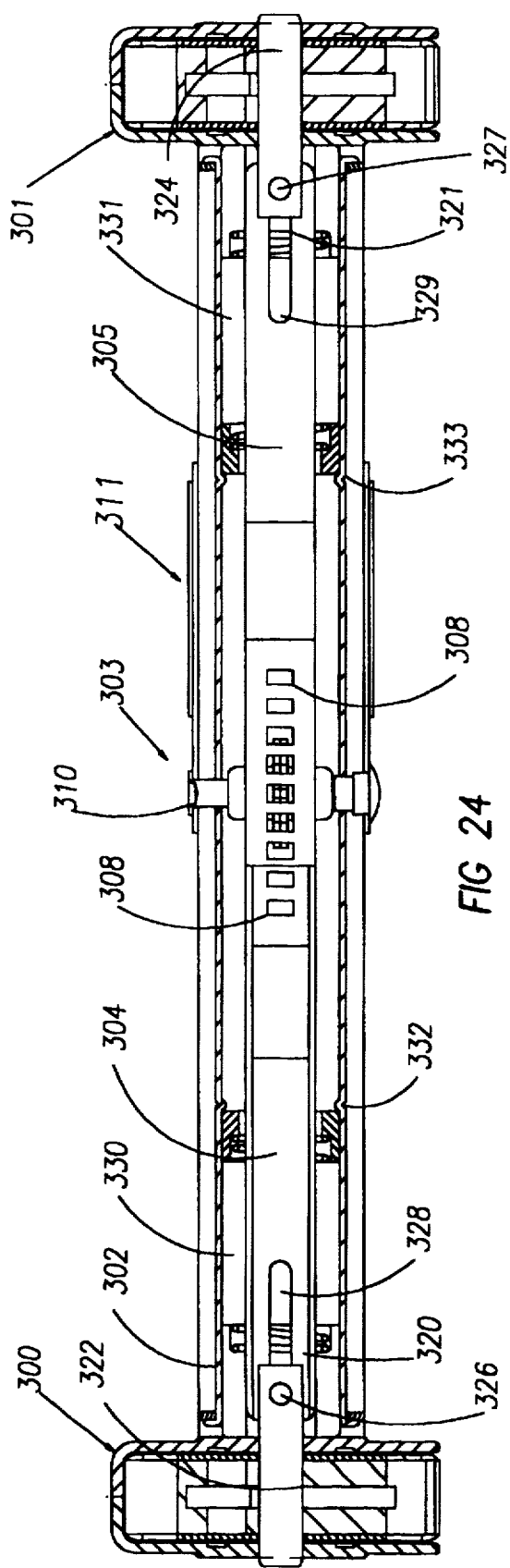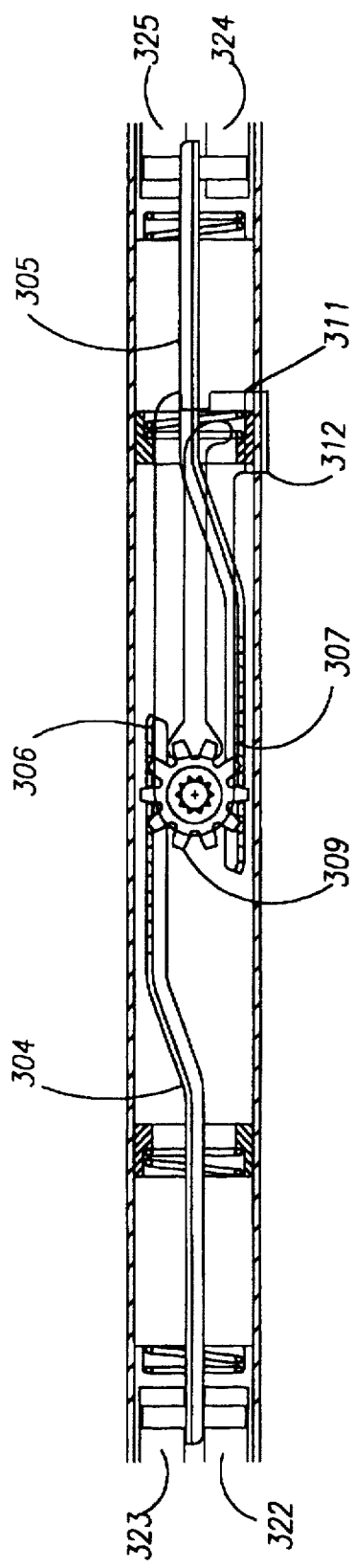

HINGE AND LADDER

THE INVENTION relates to a ladder, a hinge for reconfigurable ladder and to a locking mechanism for a reconfigurable ladder.

Folding or reconfigurable ladders and hinges, knuckles or pivot connections for such ladders have previously been suggested. Australian patent specifications 591506, 478281 and 59883/69 show various hinge or knuckle configurations. With all of these constructions, the point about which the stiles of a ladder having such hinges are caused to pivot was laterally displaced to one side of the stile and this resulted in a pronounced lobe like appearance for the hinges. These lobes projected from the stiles and interfered with the use of the ladder. For example, if the ladder was configured into a trestle and a plank was placed between two similarly constructed trestles, the lobe interfered with the proper positioning of the plank.

The construction of the hinges referred to was such that it was not possible to have a rung extend between adjacent stiles at a hinge location. Ladder rungs are typically equally spaced along the length of a ladder and when such a reconfigurable ladder was configured into a step ladder with the hinge at the apex of the ladder, a tray could not be formed or provided at the apex because of the absence of a rung at that location.

The length of the stiles with such previous ladders between the hinge at an apex of a step ladder and the nearest rung performed little useful function and added to the resultant cost of the ladder.

The construction of the hinge or knuckle was such that a plurality of possible positions could be achieved and each hinge of the ladder had to be manipulated to unlatch the hinge and the hinge then moved progressively through successive latchable positions until the desired configuration was achieved. This was a tedious operation. Adjacent sections of a stile between which a hinge extended could be pivoted about a pivot point separately from or independently of one another and this added to the difficulty in reconfiguring the ladder into the desired configuration. With hinges of the type mentioned, it was necessary to unlock each hinge separately before the ladder could be reconfigured. This was tedious and time consuming.

It is an object of the present invention to provide a hinge for a reconfigurable ladder, a reconfigurable ladder with at least one hinge in each stile and a locking mechanism which at least minimises some of the disadvantages referred to above.

According to one aspect, the invention provides a hinge for a reconfigurable ladder, the ladder having two spaced stiles and each stile comprising a plurality of stile sections, the hinge including two hinge members and a respective said hinge member being mountable to each end of two adjacent stile sections to allow the stile sections to be coupled to one another, a hinge cover extending over and receiving the hinge members and having the hinge members pivotally connected thereto about pivot axes located between sides of the stile sections, the hinge members being linked to each other whereby the pivotal movement of the hinge members relative to the cover is controlled so that both said hinge members may pivot in unison and to the same extent relative to the cover, the hinge members each having a plurality of locating apertures, and a locking mechanism cooperable with the locating apertures for locking the hinge members in a desired relative position to one another.

According to another aspect of the invention there is provided a reconfigurable ladder having two spaced stiles each consisting of a plurality of stile sections and a hinge according to the paragraph immediately above pivotally interconnecting at least two adjacent said stile sections of each said stile.

According to another aspect of the invention, there is provided a ladder having a locking mechanism for the hinge of the invention as described above, said locking mechanism being mountable relative to a rung of the ladder, the locking mechanism including an operating member movable relative to the rung and locking members biased into engagement with the hinge members and the cover to lock the hinge members into a desired orientation and movable out of engagement with the hinge members to enable the hinge members to be pivoted and locked in an alternative orientation.

According to another aspect of the invention, there is provided a ladder having a locking mechanism for the hinge of the invention as described above, the locking mechanism is mountable relative to a rung of the ladder, the rung extending between two spaced stiles and each stile comprising stile sections hinged together by the hinge of the invention, the mechanism including an operating member movable relative to the rung and linked to respective locking members biased into engagement with the hinges on opposed stiles to lock the hinge members of each said hinge into a desired orientation and the respective locking members being movable in unison out of engagement with the respective hinge members of the hinges on the opposed stiles to unlock both hinges in unison to enable the hinge members to be pivoted and locked in an alternative orientation.

The pivotal movement of the hinge members may be controlled by having the members linked in order that they move in unison relative to the cover. One way in which the hinge members may be linked is by having them interengage. This may be achieved by providing the hinge members with complementary intermeshing projections. In one embodiment, the intermeshing projections may consist of gear teeth provided on the hinge members.

In an alternative embodiment, the hinge members may be linked by one or more connecting members extending between and coupled to the hinge members. The connecting member may comprise a connecting link pivotally coupled to the hinge members. Alternatively, two cross connected springs may serve to link the hinge members to each other.

The hinge members may be fixed to the stile sections in any suitable manner. In one embodiment fasteners are used which project through the stile sections and into the hinge members. The hinge members may have apertures or recesses for receiving the fasteners. In one form, the hinge members have rearwardly directed arms terminating in fastener receiving flutes and rivets are employed to secure the hinge members to the stile sections.

The hinge members may have an arcuate leading or forward portion and the plurality locating apertures may extend at spaced intervals along the arcuate portion. In an alternative form, the plurality of locating apertures may be arranged at a location between the rearwardly directed arms and the arcuate leading portion. In that case, the plurality of locating apertures may extend along an arcuate path and at spaced intervals along that path. The number of locating apertures determines the number of different discrete positions that the hinge members may be locked into relative to the cover. Preferably, each hinge member has three locating apertures although more than this may also be employed.

Where the hinge members are linked by a connecting link, it is preferred that the connecting link also have locating apertures. The locating apertures in the link may be arranged in groups and the number of groups correspond to the number of locating apertures provided in the hinge members. The groups include at least one aperture although it is preferred that some of the groups consist of a pair of apertures. One of the apertures of a pair of apertures may also provide the means for pivotally connecting the link to one of the hinge members.

The cover may be substantially U-shaped having two side walls and a connecting web. The connecting web may act as a limit or stop to prevent the hinge members from pivoting beyond the web. In one embodiment, the cover consists of two L-shaped hinge plates having a main part which provides the side walls and a short flange extending outwardly from one edge of the main part. When the two hinge plates are placed together in mirror symmetry, the two flanges together form the web of the cover.

The main parts of the hinge plates have apertures for receiving the locking members and for receiving pivot sleeves or pins about which the hinge members pivot.

The hinge of the invention may have provision for a ladder rung to be fitted to it. Thus, hinges formed in a ladder in laterally spaced stiles may have a rung extending between them. This may be achieved by having a rung mounting plate secured to each of the covers of the two spaced hinges. The rung mounting plates may be secured to the covers employing the pivot sleeves or pins about which the hinge members pivot or in any other suitable way. The rung mounting plate may have an aperture for receiving an end of the rung and to enable the rung to be fixed thereto. One way in which this may be achieved is by swaging the end of the rung although other methods are not excluded. It is preferred that the rung and the rung receiving aperture have means to ensure that the rung is prevented from rotating relative to the rung mounting plate. Complementary recesses in the receiving aperture and projections or extensions on the rung may be present for this purpose.

Particular preferred embodiments of the invention will now be described by way of example with reference to the drawings in which.

Figure 7:
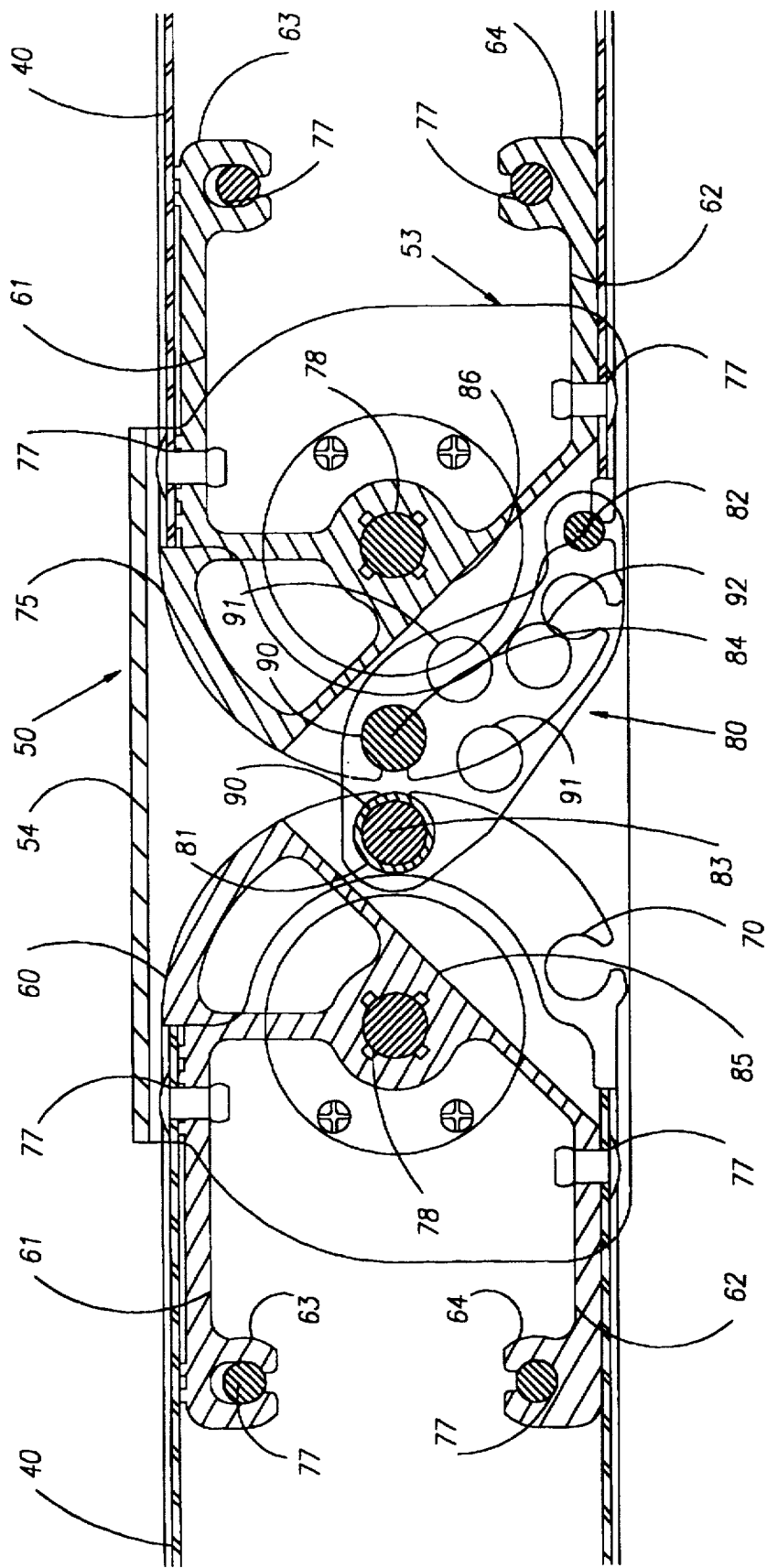
Figure 8:
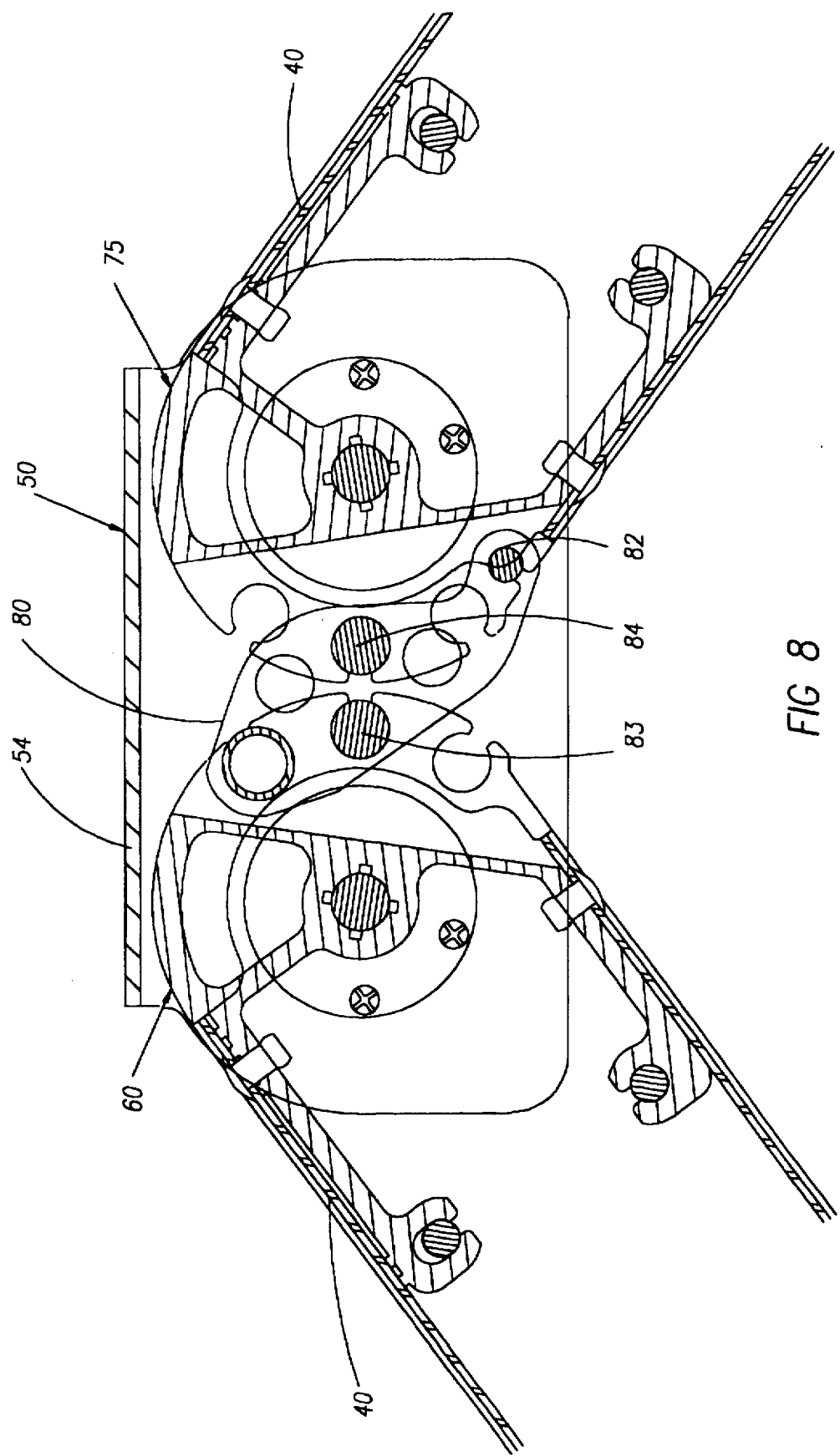
Figure 9:
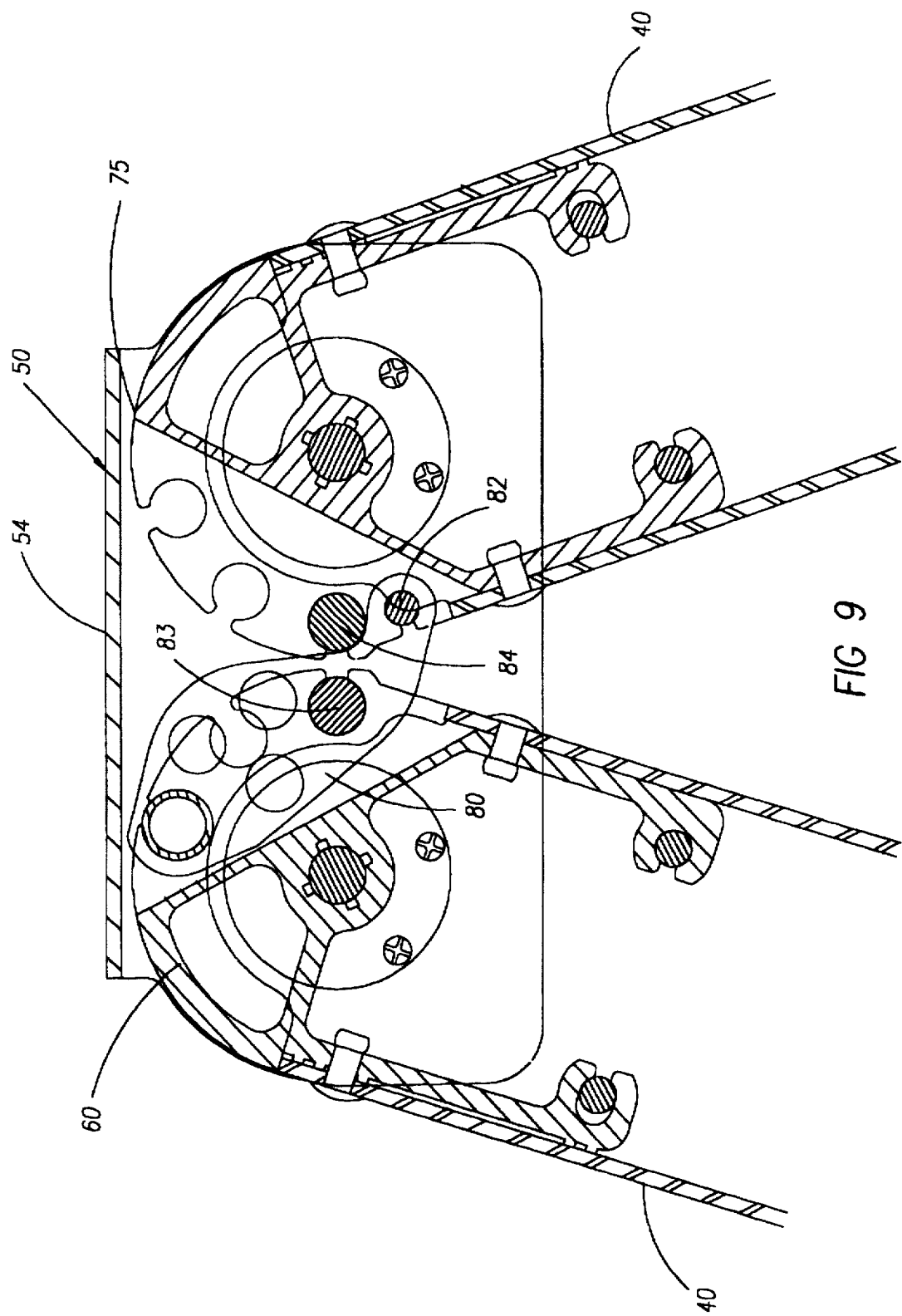
Figure 10:
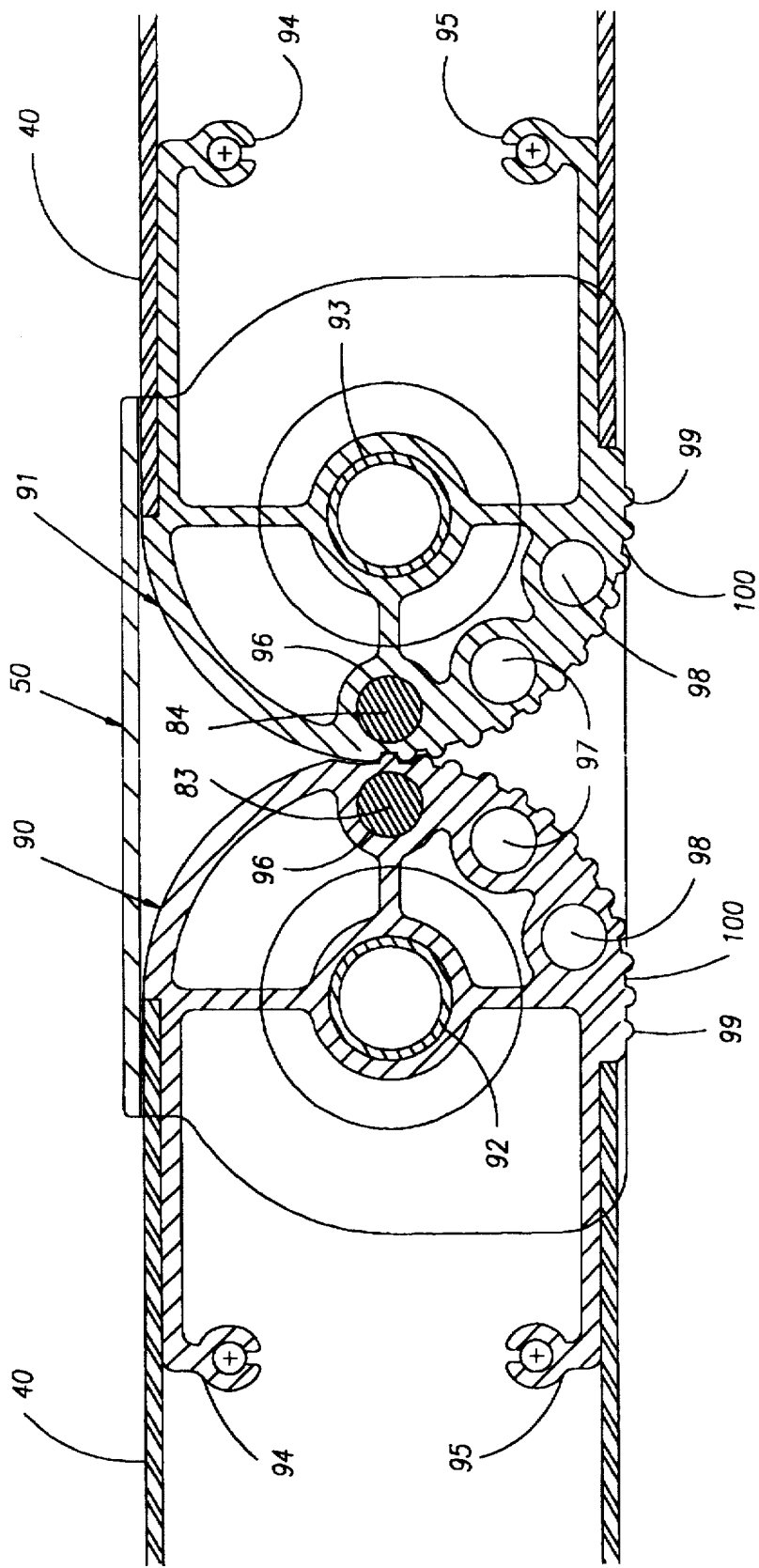
Figure 6:
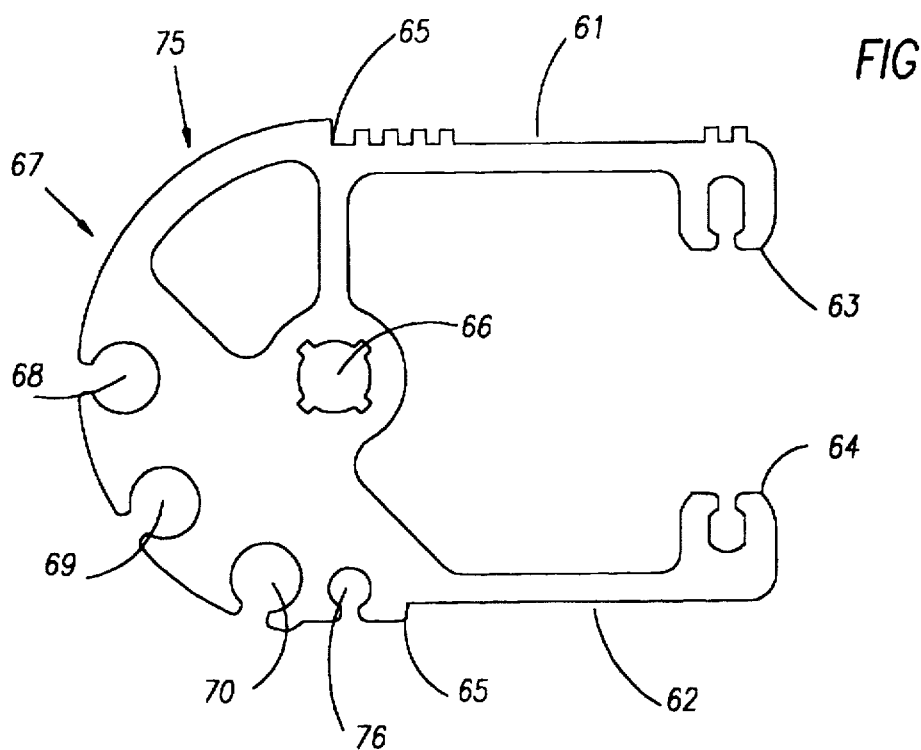
Figure 13:
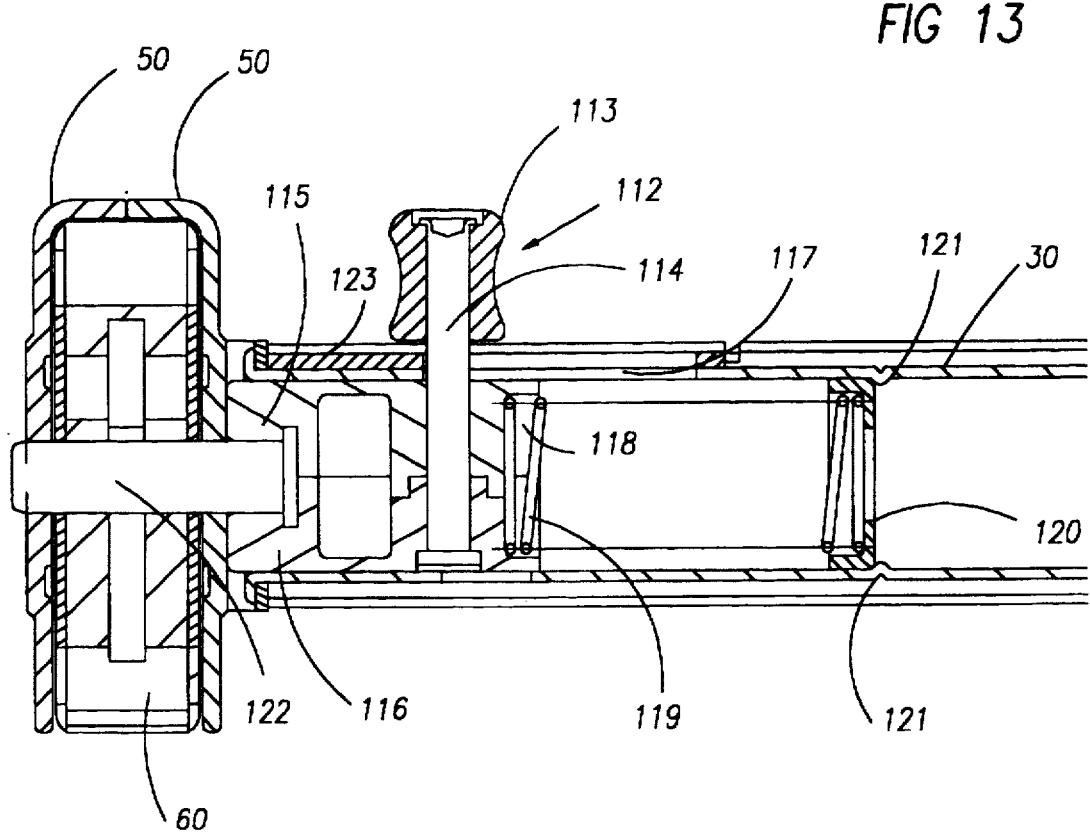
Figure 14:
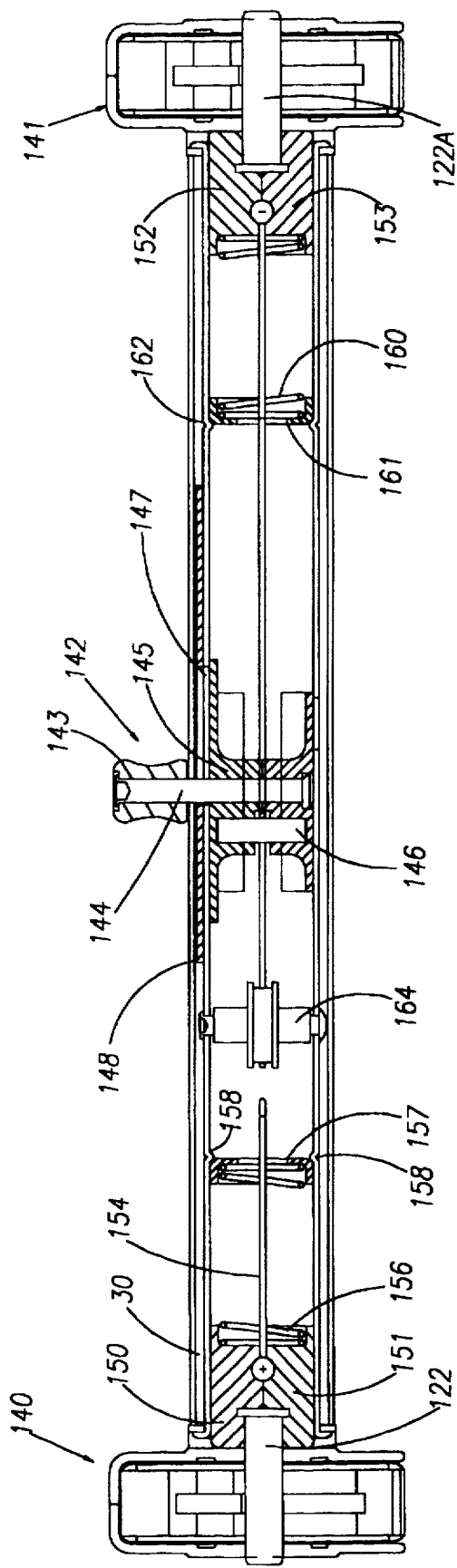
Figure 15:
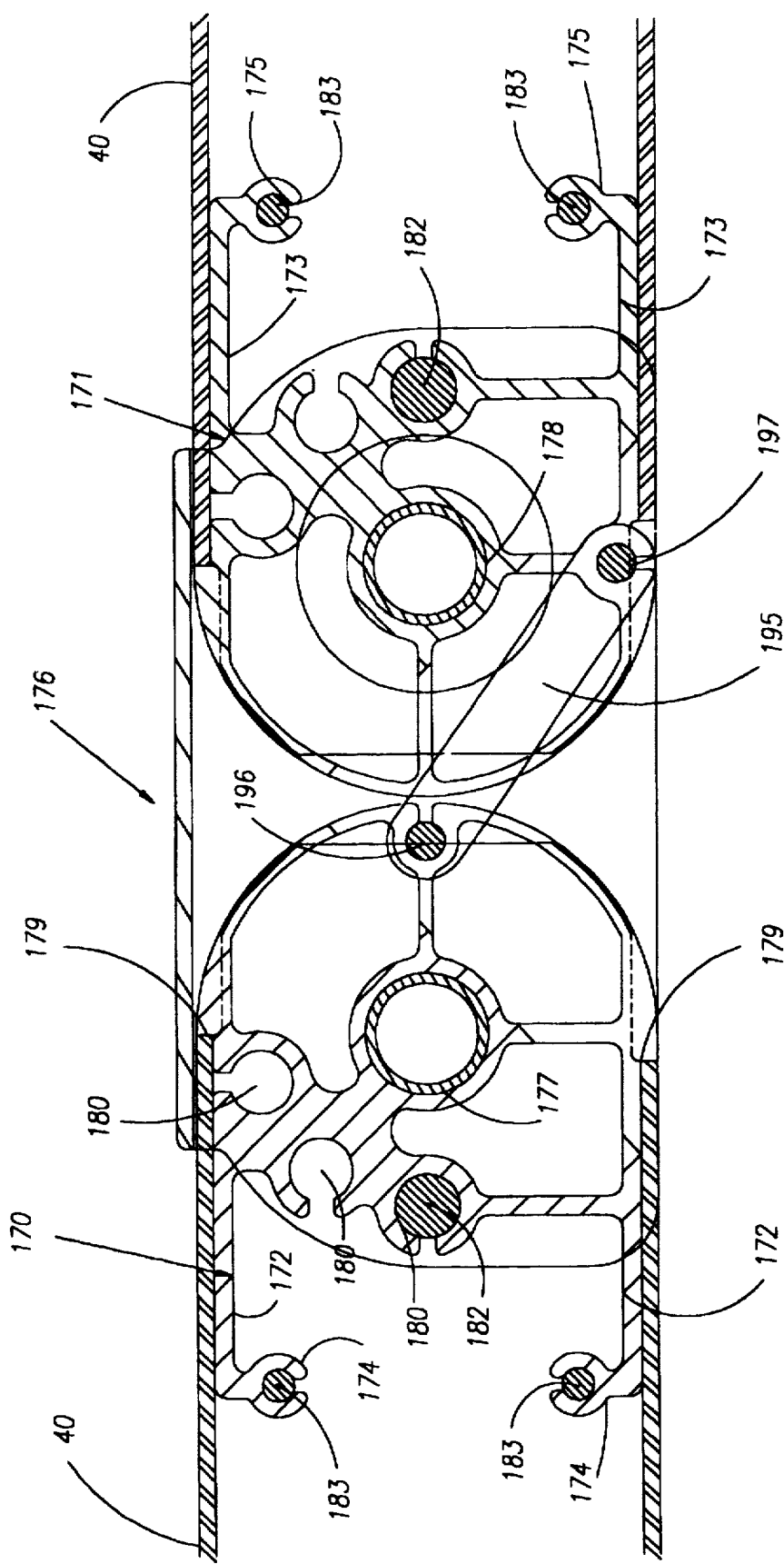
Figure 18:
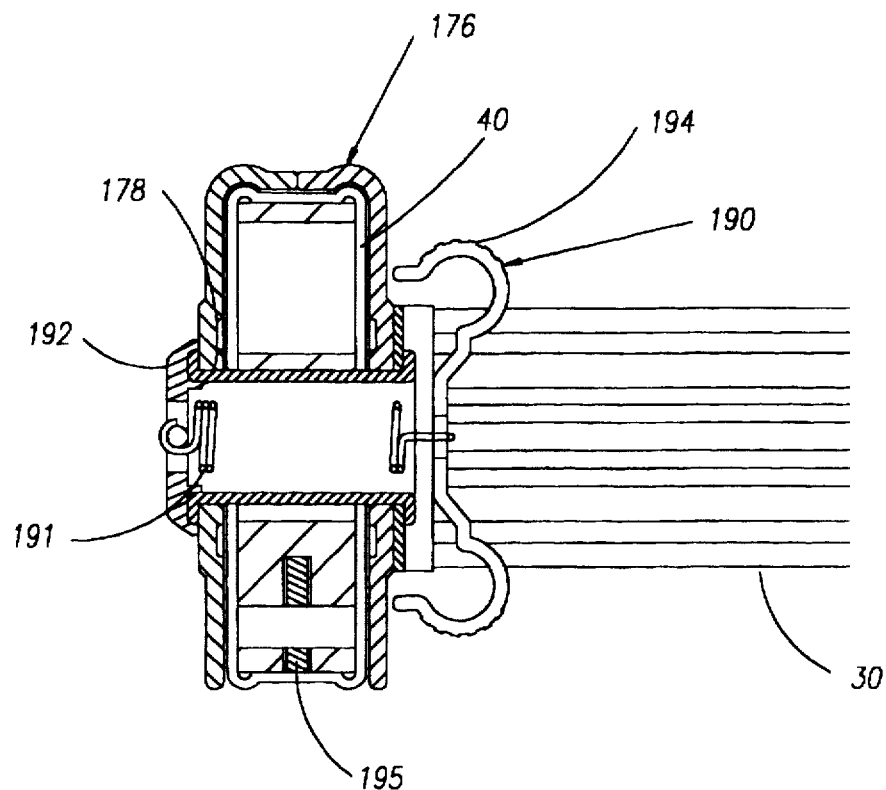
Figure 20:
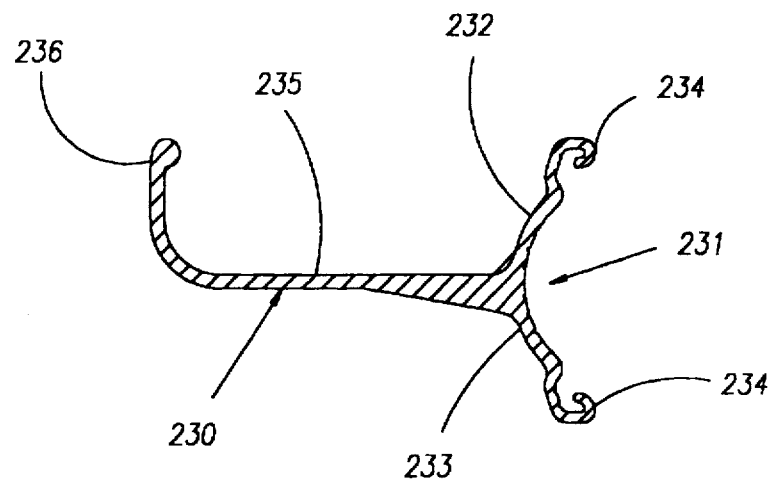
Figure 19:
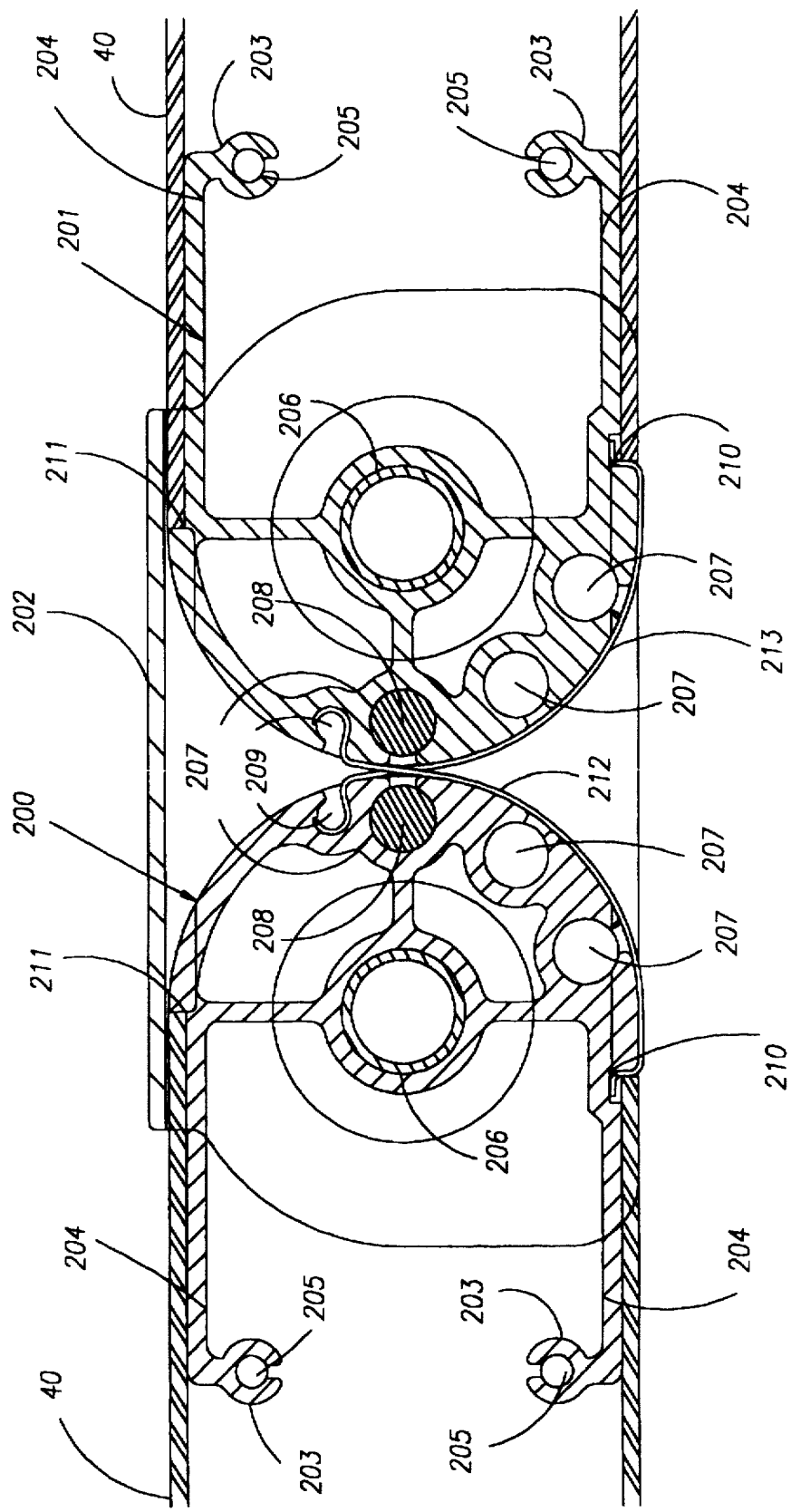
Figures 21A, 21B, 21C:
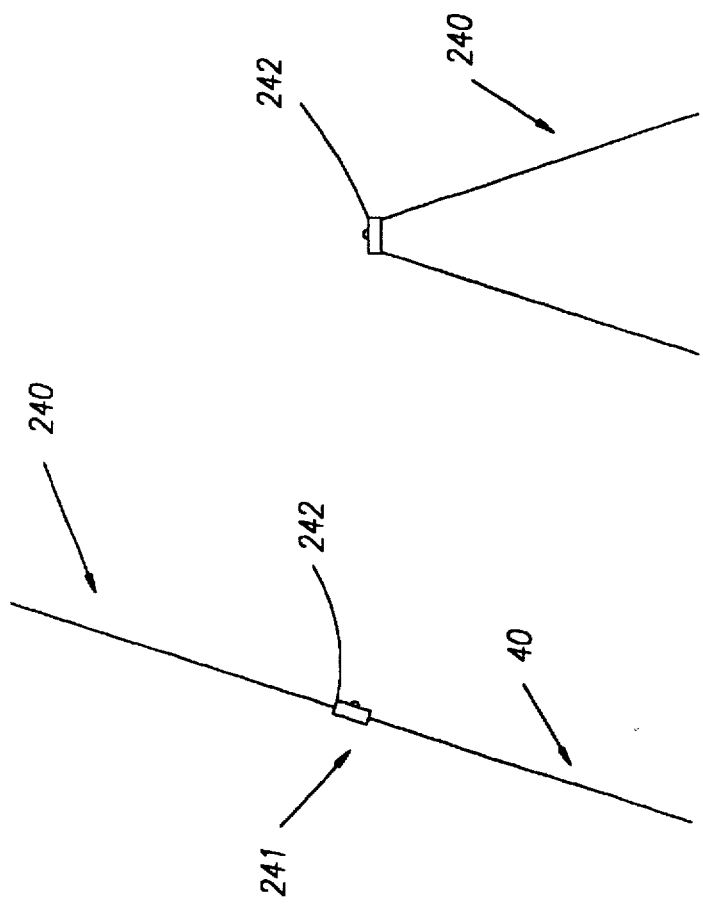
Figure 26:
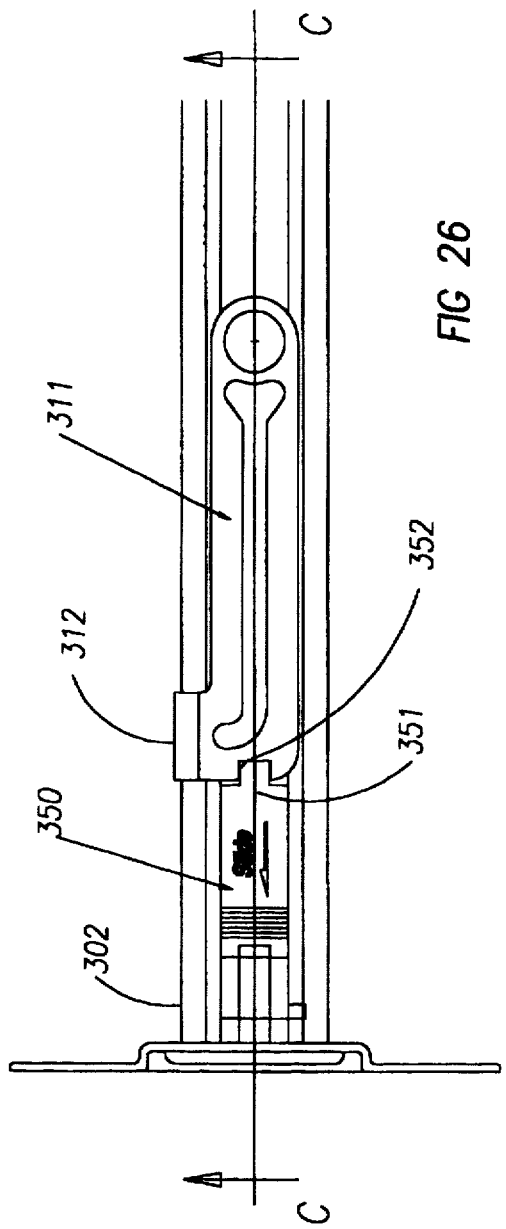
Figure 27:
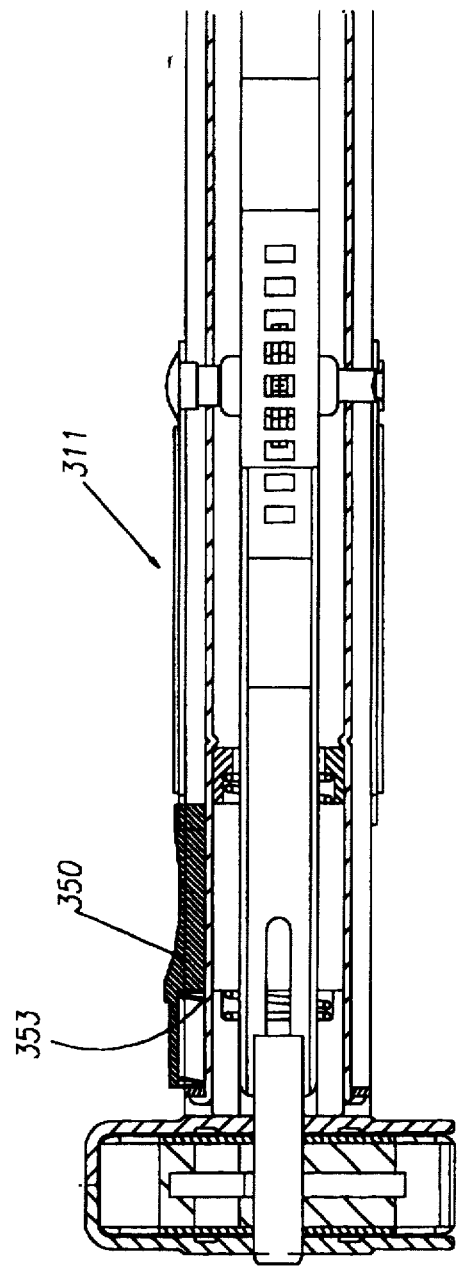

FIGS. and 4a and 4b are front and end views respectively of a hinge plate for a ladder according to an embodiment of the invention;

FIG. 5 is a side view of one hinge member in accordance with an embodiment of the invention;

FIG. 6 is a side view of a second hinge member employed with the member shown in FIG. 5;

FIG. 7 shows a sectional view of one embodiment of a hinge for a ladder according to the invention;

FIG. 8 shows the hinge of FIG. 7 in another of its possible or orientations;

FIG. 9 shows the hinge of FIG. 7 in another of its possible positions;

FIG. 10 shows another embodiment of a hinge according to the invention;

FIG. 11 shows a plan view of the hinge shown in FIG. 7;

FIG. 12 shows a side view of the hinge shown in FIG. 7;

FIG. 13 shows a sectional view taken along line B—B in FIG. 11;

FIG. 14 shows a sectional view of an alternative hinge locking arrangement to that of FIG. 13;

FIG. 15 is a sectional view of a hinge according to an alternative embodiment to that shown in FIG. 7;

FIG. 16 is a plan view of the hinge shown in FIG. 15;

FIG. 17 is a side view of the hinge of FIG. 16;

FIG. 18 is a sectional view taken along line C—C in FIG. 16;

FIG. 19 is a sectional view of a hinge according to an alternative embodiment to that shown in FIG. 7;

FIG. 20 is an end view of a tray member for use with the ladder of the invention;

FIGS. 21a, b and c and are diagrammatic representations of configurations possible for a ladder according to an embodiment of the invention;

FIGS. 22a, b, c, d and e are diagrammatic representations of configurations possible for a ladder according to another embodiment of the invention;

FIGS. 23a to 23i are diagrammatic representations of configurations possible for a ladder according to another embodiment of the invention;

FIG. 24 is a sectional view through a rung of a ladder taken through two opposed hinges;

FIG. 25 is a sectional view through the rung of FIG. 24 but at right angles to the sectional view of FIG. 24;

FIG. 26 is a side view of the rung shown in FIGS. 24 and 25 with the stiles not shown; and FIG. 27 is a sectional view taken along line C—C in FIG. 26 but showing one of the stiles.

Figure 1:
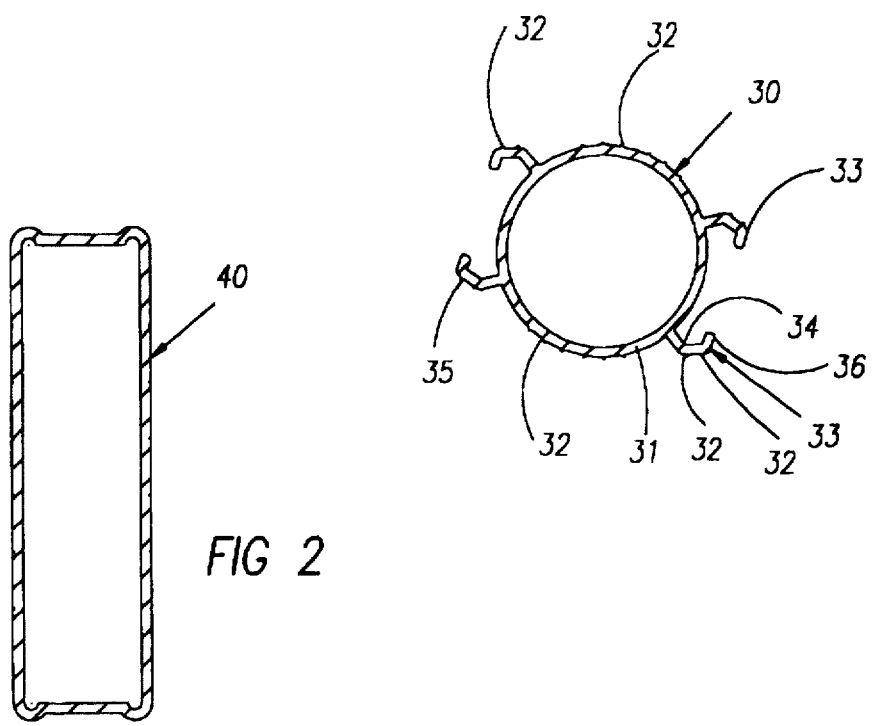
FIG. 1 is an end view of a preferred form of rung for a ladder according to an embodiment of the invention.

FIG. 1 shows an end view of a rung 30. The rung 30 has a circular body 31 with tread ribs 32 extending along the length thereof and at diametrically opposed locations on the body. Extensions 33 extend from the body 31 and have a radial portion 34, a tangential portion 35 and a short return portion 36. The tangential portion 35 is also provided with longitudinally extending tread ribs 32.

Figure 2:
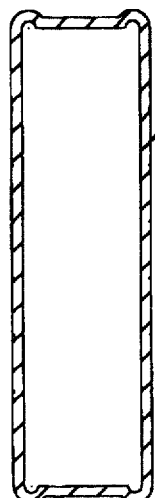
FIG. 2 is an end view of a stile for a ladder according to an embodiment of the invention.

A typical stile 40 for use in constructing a ladder and hinge according to the invention is shown in FIG. 2. The stile has a generally hollow rectangular transverse cross sectional shape.

Figure 3A:
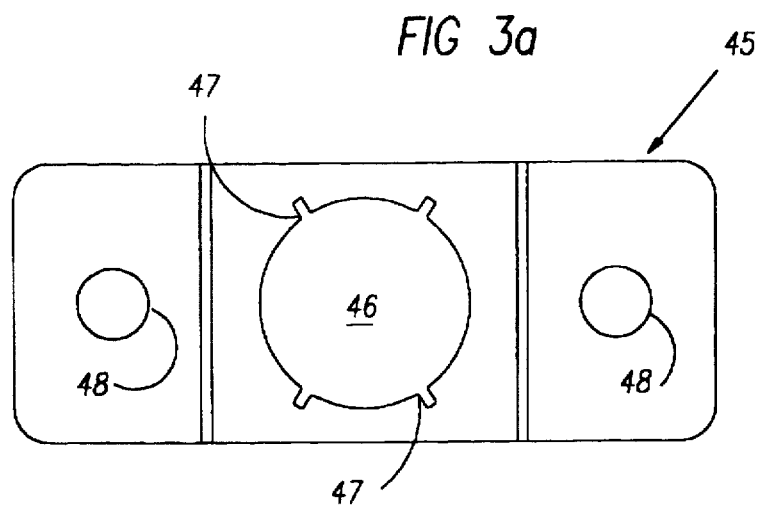
FIGS. 3a and 3b are plan and side views respectively of a rung mounting plate for a ladder according to an embodiment of the invention.
Figure 3B:
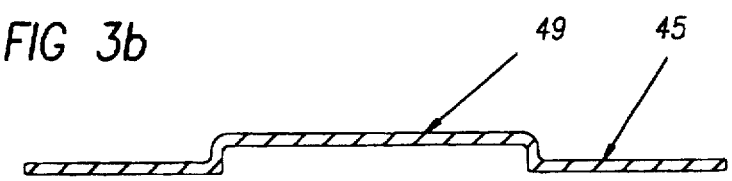

FIGS. 3a and b show a rung mounting plate 45. The plate 45 has an aperture 46 for receiving rung 30 shown in FIG. 1. Aperture 46 has locating recesses 47. These recesses ensure that the rung is unable to rotate relative to the plate. The tangential portions 35 and return portions 36 of each extension 33 are trimmed off for a short distance along the length of an near ends of the rung so that only radial portions 34 of each extension 33 remain for that short distance. These portions key into locating recesses 47 and enable the ends of the rungs to project through the plate 45 for a short distance. These ends of the rungs are swaged over to lock the rungs relative to the plate 45. Apertures 48 receive pivot pins of the hinge (shown in subsequent figures). The plate has a stepped profile as shown in FIG. 3b. The aperture 46 is provided in the central raised part 49 of the plate 45.

FIGS. 4a and b show views of a hinge plate 50 employed in a hinge for a ladder according to one embodiment. In a hinge two such plates are used arranged to form a U-shaped cover for the hinge. The plate 50 has two apertures 51 in a main part 53 thereof. Apertures 51 receive hinge pins of the hinge. Also present in the main part of plate 50 are two apertures 52 relative to which locking pins of the hinge may locate. The plate 50 has a short flange 54 extend outwardly from an edge of the main part 53. When two plates 50 are configures into a U-shaped cover, flanges 54 form a web extending between the two main parts 53 of the two plates.

FIG. 5 shows a side view of a hinge member 60 employed for forming a hinge in a ladder according to an embodiment of the invention. The member 60 has rearwardly directed arms 61, 62 which terminate in inwardly directed flutes 63, 64 for receiving fasteners to allow the member to be fixed to a section of a stile 40. Arms 61, 62 extend into the hollow space within a stile section 40 and an end of the stile section abuts against shoulders 65.

Member 60 has a central aperture 66 for receiving a hinge pivot pin or sleeve. Member 60 has an arcuate forward or leading portion 67 into which are formed flutes 68, 69, 70.

FIG. 6 shows a hinge member 75 of similar configuration to member 60 in FIG. 5. Members 60 and 75 are both employed in a hinge of the invention as shown in FIG. 7. Like numerals are used in FIG. 6 to show features that member 75 has in common with member 60 in FIG. 5. Member 75 has flute 76 for a purpose described below.

FIG. 7 shows end portions of two stile sections 40 relative to which hinge members have been fitted. Arms 61, 62 of members 60, 75 fit within the stile sections 40 and fasteners such as rivets 77 locate in flutes 63, 64 and extend through apertures in the larger side walls of the stile sections to secure the members in place. Rivets 77 also secure arms 61 and 62 to the stile sections.

Apertures 66 in members 60, 75 have sleeves or pivot pins fitted to them and it is about these sleeves or pivot pins that these members may pivot. Two hinge plates 50 locate about the stile sections 40 and limit pivotal movement of members 60, 75 in one direction only.

Members 60, 75 are linked together via apertured connecting member 80. Member 80 locates about sleeve 81 secured within flute 68 of member 60 and pivot pin 82 which in turn is received by flute 76 in member 75. Locking pins 83, 84 maintain members 60 and 75, and hence the stile sections to which they are secured, in the orientation shown in the figure. When pins 83, 84 are withdrawn members 60, 75 pivot in a controlled manner relative to each other and both maintain a corresponding orientation relative to the hinge plates 50.

As shown in FIG. 7, member 60 is provided with a slot in its arcuate forward portion terminating at a limit defined by line 85.

Likewise a slot terminating at a limit defined by line 86 exists in member 75. These slots in the members 60, 75 accommodate connecting member 80 when hinge members 60, 75 pivot.

The connecting member 80 has a first pair of apertures 90 relative to which locking pins 83, 84 may locate and a second pair 91 relative to which pins 83, 84 locate in FIG. 8. In the position shown in FIG. 9 pin 83 is received by aperture 92 in connecting member 80 while pin 84 locates in flute 70 of hinge member 75.

FIG. 7 shows the stile sections 40 collinear relative to one another. FIG. 8 shows the stile sections defining an angle of about 120°, while FIG. 9 shows the stile sections at about 30° to each other.

FIG. 10 shows an alternative ladder hinge to that shown in FIGS. 7 to 9. The ends of the stile sections 40 receive hinge members 90, 91. Members 90, 91 have an identical shape and are received on and pivot about pivot pins or sleeves 92, 93. Two hinge plates 50 define a U-shaped profile and extend about the members 90, 91 and have sleeves 92, 93 secured to them. Flutes 94, 95 receive fasteners to secure the members to the stile sections. Locking pins 83 and 84 extend through apertures 96 to lock the hinge members together. The pins may be removed, the hinge members pivoted and the pins aligned either relative to apertures 97 or 98 to lock the members 90, 91 selected orientations relative to one another. To ensure that the hinge members 90, 91 maintain the same orientation relative to one another and to the hinge plates 50 as they pivot the arcuate leading faces are provided with intermeshing teeth 99 and recesses 100.

FIGS. 11, 12 and 13 show various views of a hinge in a ladder. The portion of the ladder illustrated includes a rung 30, a hinge 110 and two stile sections 40 projecting from the hinge 110. The hinge is formed at a location where a rung is present. Rivets 111 secure two hinge members (not visible in these figures) within ends of the two stile sections 40. Two hinge plates 50 form a U-shaped cover extending over ends of the stiles. Rung mounting plate 45 is secured to one of the hinge plates 50 by two pivot pins or sleeves 78. The sleeves have a flange at one end and the other end is deformed or swaged to lock the sleeves in place. These sleeves extend through the apertures 66 (see FIGS. 5 and 6) of the hinge members. Rung 30 extends through aperture 46 in rung mounting plate 45 and its end 30a is swaged relative to plate 45.

Operating mechanism 112 includes a knob 113, a shaft 114 and a two part block 115, 116. The shaft 114 extends through a slot 117 in the rung 30 and through blocks 115, 116. The blocks have a recess 118 for receiving one end of a spring 119. A cap 120 receives the other end of the spring 119 and the cap is prevented from moving further along the interior of the rung 30 by detents 121. Two locking pins 122 are captured between the blocks 115, 116. Movement of the operating mechanism 112 against the spring 119 withdraws pins 122 from the hinge members and allows those members to be pivoted about sleeves 78. Once the hinge members have been pivoted to the desired position, knob 113 may be released and the pins 122 once again locate in apertures in the hinge members and lock those members into the new position.

In order to reduce wear on the rung in the vicinity of slot 117, a strip 123 of suitable material is positioned between adjacent extensions 33 on the rung 30. Strip 123 has a slot corresponding to slot 117.

A ladder may have hinges of the type described at corresponding locations on two transversely spaced stiles and with the locking arrangement shown in FIG. 13 the two transversely spaced locking arrangements must both be operated to enable the ladder to be hinged at that location. The configuration shown in FIG. 14 enables both transversely spaced locking arrangements to be simultaneously operated.

FIG. 14 shows a ladder hinge 140 formed as previously discussed at one side of the ladder and another hinge 141 at the other side of the ladder. Both of these hinges may be constructed as shown in FIG. 7 or employing one of the other embodiments of the invention. The operating mechanism 142 includes a knob 143 and a shaft 144. The shaft is received by a slide 145 located within the rung 30. Pin 146 is carried by the slide 145. The shaft 144 extends through a slot 147 in the rung 30 and in a slot in a wear reducing strip 148. Strip 148 is received between extensions 33 on the rung as previously mentioned (see FIG. 1). The strip 148 may be fixed to the rung by fasteners (not shown).

Locking pins 122, 122a are captured by respective block formed in two halves 150, 151 and 152, 153. These blocks also capture respective ends of a cord 154. A spring 156 extends between the left hand block halves 150, 151 and a cap 157. The cap 157 is prevented from moving within the stile 30 by detent 158. A spring 160 extends between the right hand block halves 152, 153 and a cap 161. The cap 161 is prevented from moving within the stile 30 by detent 162. A pulley 164 is rotatably mounted within the rung 30. The cord 154 extends freely through the slide 145 and has one end anchored by block 152, 153. The cord extends under the pulley 164, then under and around pin 146 and has its other end anchored by block 150, 151. By moving operating mechanism 142 to the right of FIG. 14 the pins 122 and 122a are simultaneously withdrawn from the respective hinge members forming the hinges 140, 141 and the ladder may be hinged and locked into a new orientation when the operator 142 is released.

FIGS. 15, 16 and 17 show an alternative ladder hinge to that illustrated in FIGS. 7 to 9 and FIG. 10. Hinge members 170, 171 have rearwardly extending arms 172, 173 terminating in flutes 174, 175 received within ends of stiles 40. Hinge plates 176 cover hinge members 170, 171 and these members are hinged to the plates by sleeves or hinge pins 177, 178.

Hinge member 170 has shoulders 179 against which ends of the stile sections 40 may abut. Three locking apertures 180 are present in member 170 and the hinge plates have apertures 181 (see FIG. 17) which align with a selected one of the apertures. Locking pins 182 locate through apertures 181, and selected ones of apertures 180 and corresponding apertures in member 171 to lock the stile sections 40 and hinge members at a desired orientation to one another.

Rivets 183 locate in flutes 174, 175 and through the stiles 40 to secure members 170, 171 to the stiles.

A locking slide 190 is mounted on rung 30 for movement along it. Springs 191 are anchored to the slide 190 and to a keeper 192 to bias the slide towards an adjacent stile 40. The slide 190 has the two locking pins 182 mounted to a body 193. Central portion 194 of the slide 190 can be grasped by a user to cause the slide to move against the action of the springs to disengage pins 182 from the hinge plates and hinge members. Once disengaged the hinge may be manipulated to adopt a new desired orientation. The slide is then released to lock the hinge into this new position. A similar operation needs to be performed for the transversely spaced hinge in a stile which forms the other side of the ladder.

Link 195 extends between hinge members 170, 171 and is pivotally connected to them at the locations identified by numerals 196 and 197 at 196, 197. This link ensures the hinge members move together and maintain a desired orientation relative to one another. The arcuate adjacent faces of the hinge members are slotted to accommodate the link 195.

FIG. 19 shows a further alternative hinge construction having sections 40, two hinge members 200, 201 and two hinge plates 202 covering the members 200, 201. Flutes 203 at ends of arms 204 allow rivets 205 to secure the members 200, 201 to the stile sections 40. Sleeves or hinge pins 206 extend through the hinge members and the plates 202 and it is about the sleeves 206 that members 200, 201 pivot relative to plates 202. The members 200, 201 have apertures 207 relative to which locking pins 208 may locate. Pins 208 also extend through apertures in plates 202 and a locking arrangement like that shown in FIGS. 11 and 12 or 13 may be used to move the pins to unlock the hinge.

Members 200, 201 have locating recesses 209 and shoulders 210, 211. Cross connected linking springs 212, 213 connect the members together so that they move in unison to maintain them in a desired relative orientation when they are pivoted about hinge plates 202.

FIG. 20 shows an end view of a tray extension which may be secured relative to a rung to provide a ledge for tools or the like. Extension 230 has an attachment end 231 with opposed arms 232, 233. Each of these arms have return end portions 234 which locate about extensions 33 on a rung 30 shown in FIG. 1. The extension 230 has a ledge portion 235 and a lip 236 at its free end. Extension 230 is of a length corresponding to the distance between two laterally spaced stiles. When the extension 230 is positioned on a rung located at a hinge at an apex of a ladder configured as a step ladder, ledge portion 235 extends substantially in a horizontal direction. When the ladder is configured as a straight ladder, ledge portion 235 extends in a direction generally along the stiles and does not interfere with the normal use of the ladder.

FIGS. 21a to 21c are diagrammatic views of a ladder 240 according to an embodiment of the invention. FIG. 21c shows the ladder collapsed or in its storage position. The ladder has two transversely spaced stiles consisting of stile sections 40 with a single hinge 241 in each of the stiles. The operating knob 242 like knob 113 in FIG. 11 or 143 in FIG. 14 is clearly shown in these FIGS.

FIGS. 23a to 23i show a diagrammatic view of a ladder according to another embodiment of the invention. The ladder 250 is shown in its collapsed or storage position in FIG. 23e. The other Figures show alternative use configurations into which the ladder 250 may be configured. The ladder has two laterally spaced stile consisting of stile sections 40 and a plurality of hinges 251 in each of the stiles. The operating knob 252 of each operating mechanism like knob 113 or 143 in FIGS. 11 or 14 respectively extend outwardly from the ladder in an alternating opposite direction as shown.

FIGS. 22a to 22e show a ladder 260 having a main portion 261 consisting of two laterally spaced stiles consisting of stile sections 40 with each stile having a single hinge 262. The operating knob 263 associated with each hinge extends outwardly to one side of the ladder as shown. The ends of each of the two laterally spaced stiles 40 are each provided with telescopic extensions 264. The extensions 264 may be retracted as shown in FIGS. 22a and e, fully extended as shown in FIGS. 22b and c or partially extended as shown in FIG. 22d. The extensions 264 may be locked into any of these positions.

The part of the ladder shown in FIGS. 24 to 27 has a hinge 300 on one side and a hinge 301 on another side. A rung 302 extends between the hinges.

Operating mechanism 303 includes two oppositely directed arms 304, 305. Each of these arms has an inner end 306, 307 provided with slots 308. A gear 309 is mounted on a shaft 310. The shaft 310 is journalled in apertures in the rung and is adapted to rotate relative to the rung 302.

An operating lever 311 is fixed to the shaft 310 such that when the lever is pivoted the shaft and the gear are caused to rotate. The lever is U shaped and straddles the rung 302 and has a connecting portion 312 which extends across the rung 302 and acts as an operating handle.

The arms 304, 305 are cranked as shown and have an outer end 320, 321 to which locking pins 322, 323 and 324, 325 are secured by locating pins 326, 327. Pins 326, 327 are received by a slot 328, 329 provided in ends 320, 321 of the arms.

Spring housing 330, 331 extend around the ends 320, 321 of the arms and bear against detents 332, 333 provided extending into the interior of the rung 302.

FIG. 24 shows the locking mechanism in its locked condition with the locking pins extending through the hinges 300, 301. By pivoting the lever 311 from the position shown to extend outwardly of the run, the pins 322, 323 and 324, 325 are drawn into the housings 330, 331 against the action of springs 334, 335. This unlocks the hinges 300, 301 to allow adjacent sections of the ladder to be pivoted relative to one another. The lever 311 may be returned to the position shown to the right in FIG. 25. This is possible even prior to the pins 322, 323 and 324, 325 returning to their locked position relative to the hinges. The slots 328, 329 allow this to occur.

The hinges are configured into their new position and the pins are caused to return to the locked position by the springs.

The locking mechanism allows simultaneous unlocking of the hinges by operation of a single lever.

FIGS. 26 and 27 show a locking slide 350 mounted to the rung 382. The slide has a nose portion 351 engageable in a recess 352 formed in a side of the lever 311. When the slide 350 is in position shown in FIG. 26 the lever 311 is locked against pivotal movement.

A spring 353 is located in a recess formed in the underside of slide 350. Thus spring biases portions 351 into the recess 352.

I claim:

1. A hinge for a reconfigurable ladder, the ladder having two spaced stiles and each stile comprising a plurality of stile sections, the hinge including two hinge members and a respective said hinge member being mountable to each end of two adjacent stile sections to allow the stile sections to be coupled to one another, a hinge cover extending over and receiving the hinge members and having the hinge members pivotally connected thereto about respective pivot axes located between sides of the stile sections, the hinge members being linked to each other by at least one link member pivotally coupled to the hinge members at locations spaced from the pivot axes and extending between the hinge members, whereby the pivotal movement of the hinge members relative to the cover is controlled so that both said hinge members may pivot in unison and to the same extend relative to the cover, the hinge members each having a plurality of locating apertures, and a locking mechanism cooperable with the locating apertures for locking the hinge members in a desired relative position to one another.

2. The hinge in claim 1 including two said link members with the two link members including springs and the spring crossing over one another at a location between the hinge members.

3. The hinge of claim 1 wherein the hinge cover has a plurality of apertures and the locking mechanism cooperates with the apertures in the cover and the hinge members for locking the hinge members in a desired relative position to one another.

4. The hinge of claim 1 wherein the hinge cover has a plurality of apertures, the link member has a plurality of apertures and the locking mechanism cooperates with the apertures in the hinge member, the cover and in the link member for locking the hinge members in a desired relative position to one another.

5. The hinge of claim 1 wherein the cover is substantially U shaped having two side walls and a connecting web, the connecting web acts to limit the extent to which the hinge members may pivot.

6. The hinge of claim 5 wherein the cover is made of two L shaped parts which together form the substantially U shaped configuration.

7. The hinge of claim 1 wherein the hinge members have rearwardly directed arms terminating in fastener receiving flutes for securing the hinge members to the stile sections.

8. The hinge of claim 1 wherein each of the hinge members has an arcuate leading portion and the locating apertures are located at spaced locations along the arcuate portion of each of the hinge members.

9. The hinge of claim 7 wherein the locating apertures are present in the hinge members between the rearwardly directed arms.

10. A reconfigurable ladder having two spaces stiles each consisting of a plurality of stile sections and a hinge according to claim 1 pivotally interconnecting at least adjacent said stile sections of each said stile.

11. The ladder of claim 10 wherein the locking mechanism is mounted relative to a rung of the ladder and includes an operating member movable relative to the rung and having locking members biased into engagement with the hinge members and the cover to lock the hinge members into a desired orientation and movable out of engagement with the hinge members to enable the hinge members to be pivoted and locked in an alternative orientation.

12. The ladder of claim 10 wherein the locking mechanism is mounted relative to a rung of the ladder, the rung extending between two spaces stiles and each stile comprising stile sections hinged together, the mechanism including an operating member movable relative to the rung and linked to respective locking members biased into engagement with the hinges on opposed stiles to lock the hinge members of each said hinge into a desired orientation and the respective locking members being movable in unison out of engagement with the respective hinge members of the hinges on the opposed stiles to unlock both hinges in unison to enable the hinge members to be pivoted and locked in an alternative orientation.

13. The ladder of claim 10 wherein the locking mechanism is mounted relative to a rung of the ladder and includes an operating member movable relative to the rung and locking members biased into engagement with the hinges on each side of the ladder and movable out of engagement with the hinges to allow the ladder to be configured into an alternative position.

14. The ladder of claim 13 wherein the operating member comprises a lever and the locking members comprise oppositely directed arms and the mechanism includes a gear by the lever and the gear engages the oppositely directed arms.

15. The ladder of claim 14 wherein ends of the opposed arms spaced from the gear are slotted and have locking pins mounted thereto for movement within the slot.

16. The ladder of claim 10 wherein the locking mechanism is located substantially within the rung.

* * * * *